(12) United States Patent
Okamoto

(10) Patent No.: US 7,590,842 B2
(45) Date of Patent: Sep. 15, 2009

(54) SERVICE PROVIDING SYSTEM AND AUTHENTICATION SYSTEM, AS WELL AS SIGNATURE GENERATING APPARATUS, SERVICE UTILIZING APPARATUS AND VERIFICATION APPARATUS

(75) Inventor: Chikashi Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 10/887,334

(22) Filed: Jul. 9, 2004

(65) Prior Publication Data
US 2005/0050327 A1    Mar. 3, 2005

(30) Foreign Application Priority Data
Sep. 2, 2003    (JP)    ............................. 2003-309726

(51) Int. Cl.
*H04L 9/32*    (2006.01)
*G06F 21/00*    (2006.01)
(52) U.S. Cl. .......................................... 713/168; 726/2
(58) Field of Classification Search ................. 713/168, 713/175, 176, 170, 180; 726/2, 4, 11, 12
See application file for complete search history.

(56) References Cited

U.S. PATENT DOCUMENTS

| | | | |
|---|---|---|---|
| 6,934,838 B1 * | 8/2005 | Boyce et al. ................. | 713/156 |
| 6,990,583 B2 * | 1/2006 | Matsuyama et al. ......... | 713/175 |
| 7,085,840 B2 * | 8/2006 | de Jong et al. .............. | 709/229 |
| 7,096,363 B2 * | 8/2006 | Kon et al. .................... | 713/176 |
| 7,107,462 B2 * | 9/2006 | Fransdonk .................. | 713/193 |
| 7,353,396 B2 * | 4/2008 | Micali et al. ................. | 713/176 |
| 2004/0012569 A1 * | 1/2004 | Hara .......................... | 345/169 |
| 2004/0073801 A1 * | 4/2004 | Kalogridis et al. .......... | 713/176 |
| 2004/0074971 A1 * | 4/2004 | Swartz et al. ........... | 235/472.01 |

FOREIGN PATENT DOCUMENTS

| | | |
|---|---|---|
| JP | 2002-109039 | 4/2002 |
| JP | 2002-207838 | 7/2002 |
| JP | 2002-236664 | 8/2002 |

* cited by examiner

*Primary Examiner*—Gilberto Barron, Jr.
*Assistant Examiner*—Abdulhakim Nobahar
(74) *Attorney, Agent, or Firm*—McDermott Will & Emery LLP

(57) ABSTRACT

For providing a service providing system and an authentication system, and also a signature generating apparatus, a service utilizing apparatus and a verification apparatus, enabling automatic access, being widely or commonly usable in a communication means thereof, and achieving an authentication function of high security, a system comprises a signature generating apparatus 1, a service utilizing apparatus 2, a verification apparatus 3 and a service providing apparatus 4, wherein the signature generating apparatus 1 has a means for generating a generation key and a verification key, and an electronic signature generating means using the generation key produced, thereby transmitting an electronic signature to the service utilizing apparatus 2, while transmitting the verification key to the verification apparatus 3, wherein the service utilizing apparatus 2 has a service request means, thereby transferring a number to the signature generating apparatus 1, while transmitting the electronic signature to the verification apparatus 3 and the service to be utilized to the verification apparatus 3, wherein the verification apparatus 3 has a number producing means for use of producing the electronic signature, a verification key holding means, and an electronic signature verification means using the verification key therein, thereby transmitting the number to the service utilizing apparatus 2, while transferring a service request to the service providing apparatus 4.

10 Claims, 11 Drawing Sheets

DATABASE 332 OF VERIFICATION APPARATUS 3

| APPARATUS ID OF SIGNATURE GENERATING APPARATUS | SIGNATURE VERIFICATION KEY |
|---|---|
| 12480 | 8c2x579a1336b74df |
| 56291 | 79a8c2x513b74df36 |
| 38754 | 2x74df36b98c1375a |
| ⋮ | ⋮ |

FIG.11

SCREEN OF INQUIRING COMMUNICATION PATH

FOR UTILIZING CONTENTS DISTRIBUTION SERVICE, IT IS NECESSARY TO RECEIVE AN AUTHENTICATION THROUGH CONDUCTING COMMUNICATION WITH A SIGNATURE GENERATING APPARATUS.

PLEASE SELECT ONE OF THE FOLLOWING COMMUNICATION PATHS BETWEEN THE SIGNATURE GENERATING APPARATUS, AND THEN CLOCK "OK" BUTTON.

◎ USB
◎ IR (INFRARED RAY)
◎ LIGHT (SCREEN DISPLAY + READ BY CAMERA)

OK

SERVICE PROVIDING SYSTEM AND AUTHENTICATION SYSTEM, AS WELL AS SIGNATURE GENERATING APPARATUS, SERVICE UTILIZING APPARATUS AND VERIFICATION APPARATUS

BACKGROUND OF THE INVENTION

The present invention relates to a service providing system and an authentication system, as well as, a signature generating apparatus, a service utilizing apparatus and a verification apparatus, for enabling automatic accessing, while using a common communication means, and for achieving authentication function with high security.

Conventionally, there is proposed a function of displaying personal information, which is stored within a server, as a kind or sort of service for any person to confirm or authenticate her/himself, personally, anytime and anywhere, with using a portable phone, in Patent Document 1; such as, Japanese Patent Laying-Open No. 2002-207838 (2002), for example.

There is also proposed a method for building up a card system and also a card system for using a portable phone therein, wherein a registration ID, being contacted between a business company of communication connection, is displayed in the form of a two (2) dimensional display picture, with using the portable phone, and said display picture is read thereon to be used as the data for authenticating a terminal of a customer terminal, in Patent Document 2; such as, Japanese Patent Laying-Open No. 2002-109039 (2002), for example.

Further, there is also proposed an authentication system with using a portable communication terminal having a picture display means for use of authentication, on which a picture for use of authentication is displayed, being uniquely provided for a user of that portable communication terminal, for the purpose of identifying a person, in Patent Document 3; such as, Japanese Patent Laying-Open No. 2002-236664 (2002), for example.

Moreover, there is also proposed a function of protection of a host-computer from illegal accessing thereto, wherein an access code is stored within an IC card for increasing the security thereof, in Patent Document 4; such as, Japanese Patent Laying-Open No. Hei 7-200481 (1995), for example.

BRIEF SUMMARY OF THE INVENTION

With such the technologies mentioned above, it is possible to make a personal authentication with using the screen of the portable phone. However, since there cannot be used a form of "challenge and response",wherein the authentication is conducted by making a calculation correctly, responding to a numerical value being different every time when being given; therefore, it is low in the security thereof.

Also, with such the technologies mentioned above, it is possible to obtain an authentication of high security by using the IC card. However, in accessing to a verification apparatus, it is impossible to act thereon from a side of the IC card; therefore, it is difficult to achieve automation suitable for a user.

Also, with such the technologies mentioned above, communication means that can be used within the apparatus is fixed or limited, such as, optical displaying/reading, contact or contact-less communication of the IC card; therefore, it is difficult to apply it more commonly.

Accordingly, an object of the present invention, accomplished by taking the situations mentioned above into the consideration, is to provide a service providing system and an authentication system, as well as, a signature generating apparatus, a service utilizing apparatus and a verification apparatus, for enabling automatic accessing, while using a common communication means, and for achieving authentication function with high security.

For accomplishing the object mentioned above, according to the present invention, an arbitrary number produced by a verification apparatus, such as, a random number, for example, is delivered to a signature generating apparatus, and the signature generating apparatus generates an electronic signature with using the random number received. The signature generating apparatus transmits the electronic signature generated to the verification apparatus, and the verification apparatus verifies the electronic signature received. If a result of the verification is successful, then the verification apparatus authenticates the signature generating apparatus.

Also, according to the present invention, the signature generating apparatus and the service utilizing apparatus to be a substantial object of the authentication are made separated from each other, while signature generating functions of a plural number of signature generating apparatuses are centralized into one piece of the signature generating apparatus. The verification apparatus delivers the random number to the signature generating apparatus through the service utilizing apparatus, and receives the electronic signature generated by the signature generating apparatus through the service utilizing apparatus. The service utilizing apparatus and the signature generating apparatus make communication by using a means with an aid of IR (Infra-red Radiation) and/or BT (BlueTooth) and/or a light, thereby confirming that both are locating near to each other. When verifying the electronic signature generated by the signature generating apparatus, correctly, upon the random number transmitted, then the verification apparatus authenticates, not only the signature generating apparatus, but also the service utilizing apparatus which relays the random number and the electronic signature between the signature generating apparatus with using the short-distance communication means.

Also, according to the present invention, the program necessary for the communication means between the service utilizing apparatus and the signature generating apparatus is made in a form of component. The component-based program can be divided into modules of programs by a unit of the component. It is possible to renew/add the module of programs into the system during the operation thereof.

Also, according to the present invention, the service utilizing apparatus prompts a user to specify a desirable communication means, such as a communication path implemented using IR for establishing signal communications between the service utilizing apparatus and the signature generating apparatus, and it transmits information of the specified communication path to the verification apparatus. The verification apparatus transmits a communication component, corresponding to the communication means, to the service utilizing apparatus. The service utilizing apparatus loads the communication component received therein, thereby bringing the communication path thereof to be usable. The communication component transfers the information from the verification apparatus to the signature generating apparatus, and also transfers the information from the signature generating apparatus to the verification apparatus.

Also, according to the present invention, the service utilizing apparatus transmits a service utilization request to the verification apparatus, and the verification apparatus transmits the random number to the service utilizing apparatus, thereby starting a flow of authentication. However, if once the communication component is loaded onto the service utilizing apparatus, then thereafter the signature generating apparatus transmits the service utilization request to the service utilizing apparatus, while the service utilizing apparatus transfers the service utilization request to the verification apparatus, thereby starting the flow of authentication from the signature generating apparatus.

Also, according to the present invention, after succeeding the authentication, the verification apparatus transmits the service utilization request from the service utilizing apparatus to the service providing apparatus, and it transfers a response from the service providing apparatus, responding to this request, to the service utilizing apparatus.

Also, according to the present invention, the service utilizing apparatus may acknowledge that it is far from the signature generating apparatus due to the fact that it cannot make communication therewith through the short-distance communication means, thereby unloading the communication component from a memory.

Also, according to the present invention, the verification apparatus conducts the authentication process periodically, after starting the transfer of the service utilization response, thereby stopping the transfer of the service utilization response in the case when the authentication cannot be made at a certain time period.

Also, according to the present invention, with using a unique identification number assigned to the signature generating apparatus, a user is identified of the apparatus, on which the authentication is made, thereby accounting the charge for the utilization service.

As was explained in the above, according to the present invention, it is possible to provide the construction automating an access, being commonly or widely usable, in particular, the communication means thereof, and achieving the authentication function with high security thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 11 is a view for explaining an example of a screen of an input/output device of the service utilizing apparatus within the service providing system, according to the embodiment of the present invention.

DETAILED DESCRIPTION OF THE INVENTION

Hereinafter, best embodiments according to the present invention will be fully explained by referring to the attached drawings.

Figure 1:
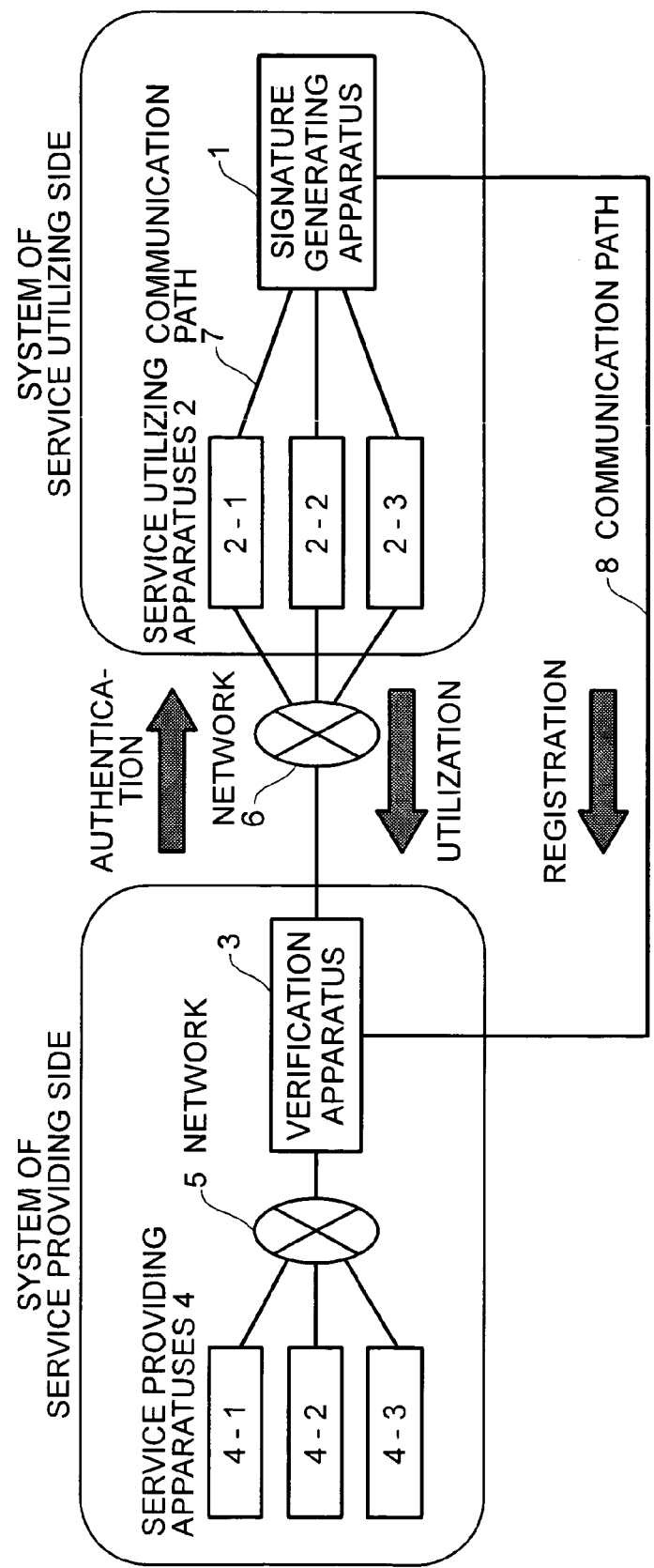
FIG. 1 is a system view for showing a brief structure of a service providing system, according to an embodiment of the present invention.

First, explanation will be made on the brief structure of the system, according to the present embodiment, by referring to FIG. 1 attached herewith. In this FIG. 1, a reference numeral 1 depicts a signature generating apparatus, 2 a service utilizing apparatus, 3 a verification apparatus, 4 a service providing apparatus, 5 and 6 networks, and 7 and 8 communication paths one to one.

The signature generating apparatus 1 and the service utilizing apparatus 2 are connected with each other through the communication path 7, thereby building up a system of service utilizing side. The verification apparatus 3 and the service providing apparatus 4 are connected with each other through the network 5, thereby building up a system of service providing side.

Also, the service utilizing apparatus 2 of the system on the service utilizing side and the verification apparatus 3 of the system on the service providing side are connected with each other through the network 6. The system of service providing side authenticates the system of service utilizing side through the network 6, while the system service utilizing side utilizes a service, which is provided by the system of service providing side, through the network 6.

Also, the signature generating apparatus 1 of the system of service utilizing side and the verification apparatus 3 of the system of service providing side are connected with each other through the communication path 8. Through the communication path 8, a verification key is registered in the system of service providing side, for verifying signature in the system of service utilizing side.

The signature generating apparatus 1 is a small-size electronic apparatus, with which a person can always carry out, and it has a function of generating a pair of keys for use of generating the electronic signature and also for verification thereof, as well as, a function of generating the electronic signature therefrom. The signature generating apparatus 1 also has a short-range or distance communication function for communicating with the service utilizing apparatus 2. As an example of this signature generating apparatus 1 can be listed up, such as, a portable telephone, a portable information terminal, a note-type PC (Personal Computer), etc.

The service utilizing apparatus 2 may be located at various places, such as, a home, a company, a house of others, an airport, a station, a cafe, a convenience store, and other stores, etc., for example, as an electronic apparatus being commonly used, for enabling a user thereof to input/output information, and it has an adaptation function of communication component and also a service utilizing function. As an example of this service utilizing apparatus 2 can be listed up, for example, a PC, a terminal apparatus located at a kiosk and that located at a convenience store, a display of a conference room, a network-enabled television apparatus, etc.

The verification apparatus 3 is an electronic apparatus for making a verification upon an access to the service providing apparatus 4 from an outside thereof, and it has a function of verifying the electronic signature, a function of selecting/providing the communication component, and also a function of mediating the services. As an example of this verification apparatus 3 can be listed up, for example, a PC, a server, a firewall, a gateway, a proxy server, etc.

The service providing apparatus 4 is an electronic apparatus for providing electronic services, and it has a service providing function. As an example of this service providing apparatus can be listed up, for example, a server or HDR (Hard Disk Recorder) for providing service of contents distribution, such as, a piece of music, a moving picture, a still picture, etc., and also a home electric controller or a home network gateway, for providing services of controlling home electric appliances or obtaining information, and a database server for providing services of data registration/correction/renewal/deletion and/or obtaining information, and so on.

The network 5 is a network for connecting between the verification apparatus 3 and the service providing apparatus 4 within the system of service providing side. As an example of this network 5 can be listed up, for example, an intra-net of a service providing company, and a home network at home, etc.

The network 6 is a network for connecting between the service utilizing apparatus 2 of the system on service utilizing side and the verification apparatus 3 of the system on service providing side. As an example of this network, the Internet can be listed up, for example.

The communication path 7 is a communication path for use of the short-distance communication, for establishing connection between the signature generating apparatus 1 and the service utilizing apparatus 2, within the system of service utilization side. As an example of this communication path can be an IR, BT, etc., for example. Also, as other example for implementing the communication path therebetween, there can be listed up a method, such as, in which the information presented on a display of the one apparatus is read out, through an optical reading device provided on the other apparatus.

The communication path 8 is a safe communication path for connecting between the signature generating apparatus 1 of the system on service utilizing side and the verification apparatus 3 of the system on service providing side. As an example of this communication path 8 can be listed up, for example, a wired communication path, such as, a serial cable or a USB calbe, etc., a short-distance communication path, such as, an IR and/or a BT, and a network enabling the encrypted one-to-one communication, such as, the Internet using SSL (Secure Socket Layer), for example.

The service utilizing apparatus 2 and the service providing apparatus 4 may be provided in a plural number thereof, respectively.

Figure 2:
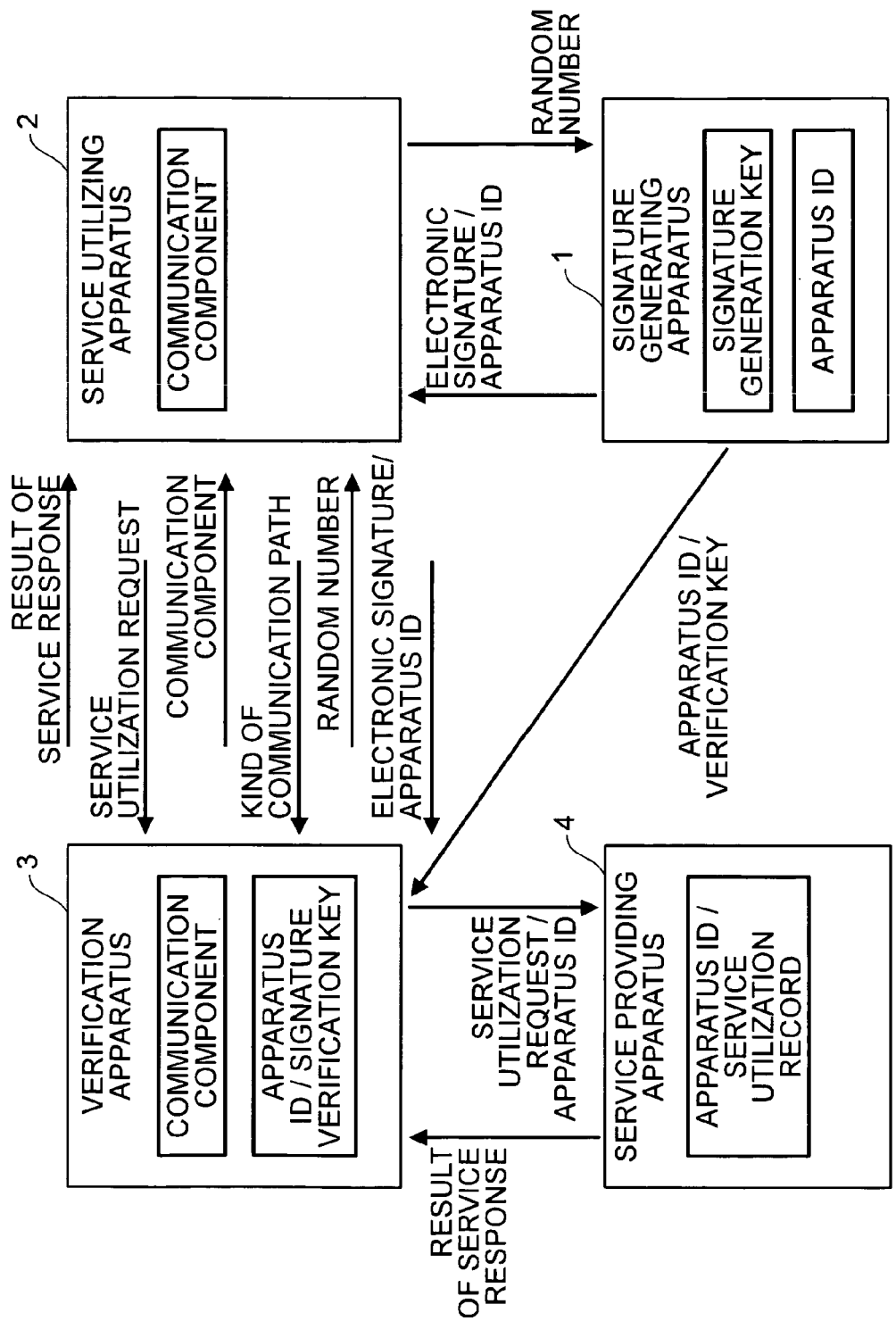
FIG. 2 is a view for explaining about information being held and transmitted by each of apparatuses, building up the service providing system, according to the embodiment of the present invention.

Next, explanation will be given on the information, which is held and transmitted to each other, by each of the apparatuses building up the system mentioned above, by referring to FIG. 2 attached herewith. The signature generating apparatus 1 holds a signature generation key generated and an apparatus ID, which is unique to the signature generating apparatus. The signature generating apparatus transmits a signature verification key, which is generated at the same time when producing the signature producing key, to the verification apparatus 3, together with the apparatus ID. The verification apparatus 3 holds the apparatus ID received and the signature verification key while keeping a correspondence or relationship between them.

The service utilizing apparatus 2 transmits a kind of the communication path obtained, to the verification apparatus 3. The verification apparatus 3 picks up the most suitable one from the communication path components held therein, thereby to transmit it to the service utilizing apparatus 2. The service utilizing apparatus 2 holds the communication path components, which are received.

The verification apparatus 3 transmits the random number generated therein to the service utilizing apparatus 2. The service utilizing apparatus 2 transmits the random number received to the signature generating apparatus 1. The signature generating apparatus 1 generates an electronic signature, with using that random number received and the signature generating key, which are held therein, and sends it to the service utilizing apparatus 2, together with the apparatus ID received.

The service utilizing apparatus 2 transmits the service utilization request to the verification apparatus 3. The verification apparatus 3 transmits the service utilization request received and the apparatus ID, which is received together with the electronic signature, to the service providing apparatus 4. The service providing apparatus 4 holds the contents of the service response to the service utilization request received and the apparatus ID received while keeping the correspondence or relationship between them. The service providing apparatus 4 transmits a result of the service response to the verification apparatus 3. The verification apparatus 3 transmits the result of service response received to the service utilizing apparatus 2.

Figure 3:
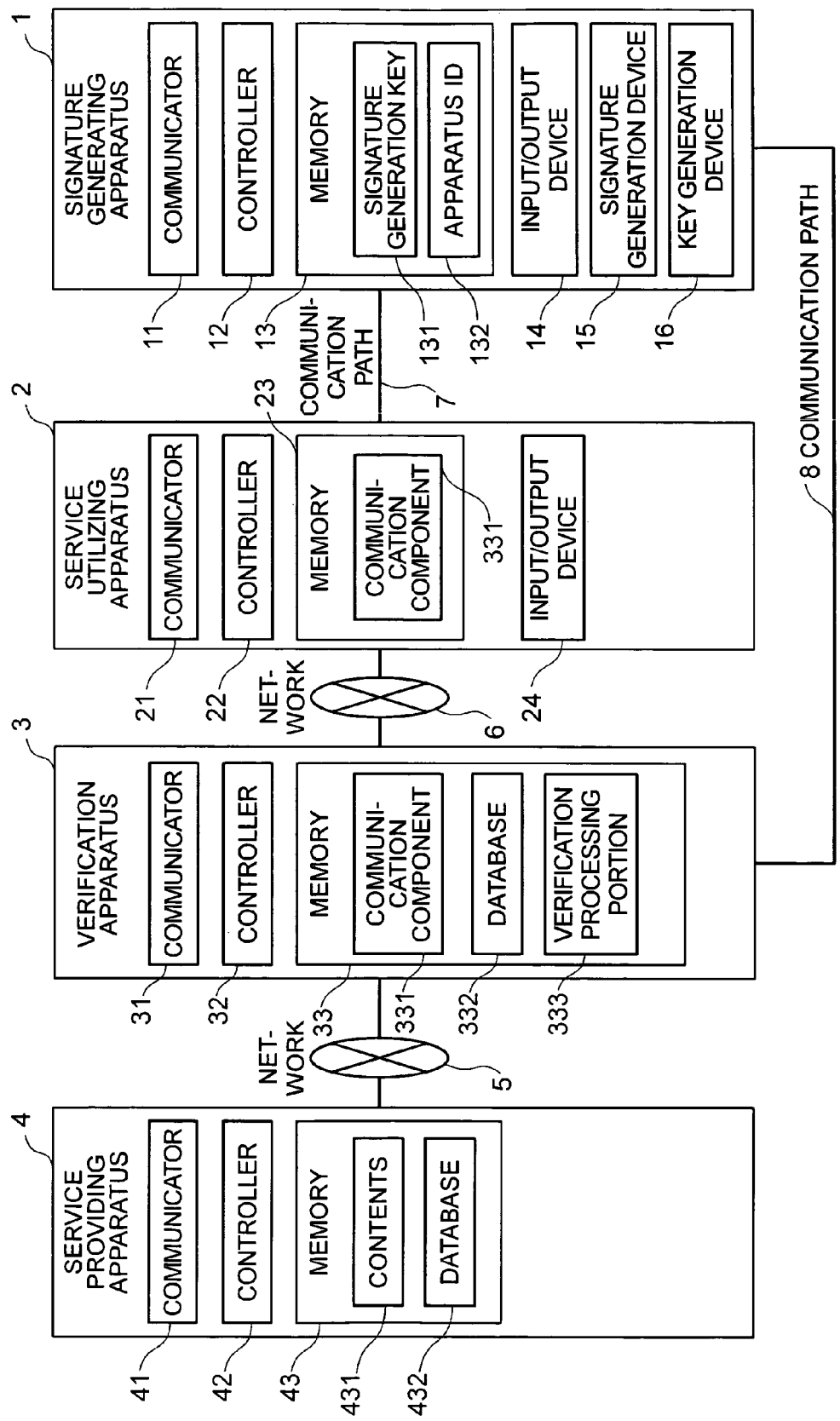
FIG. 3 is a view for explaining the brief structure of each of the apparatuses building up the service providing system, according to the embodiment of the present invention.
Figure 4:
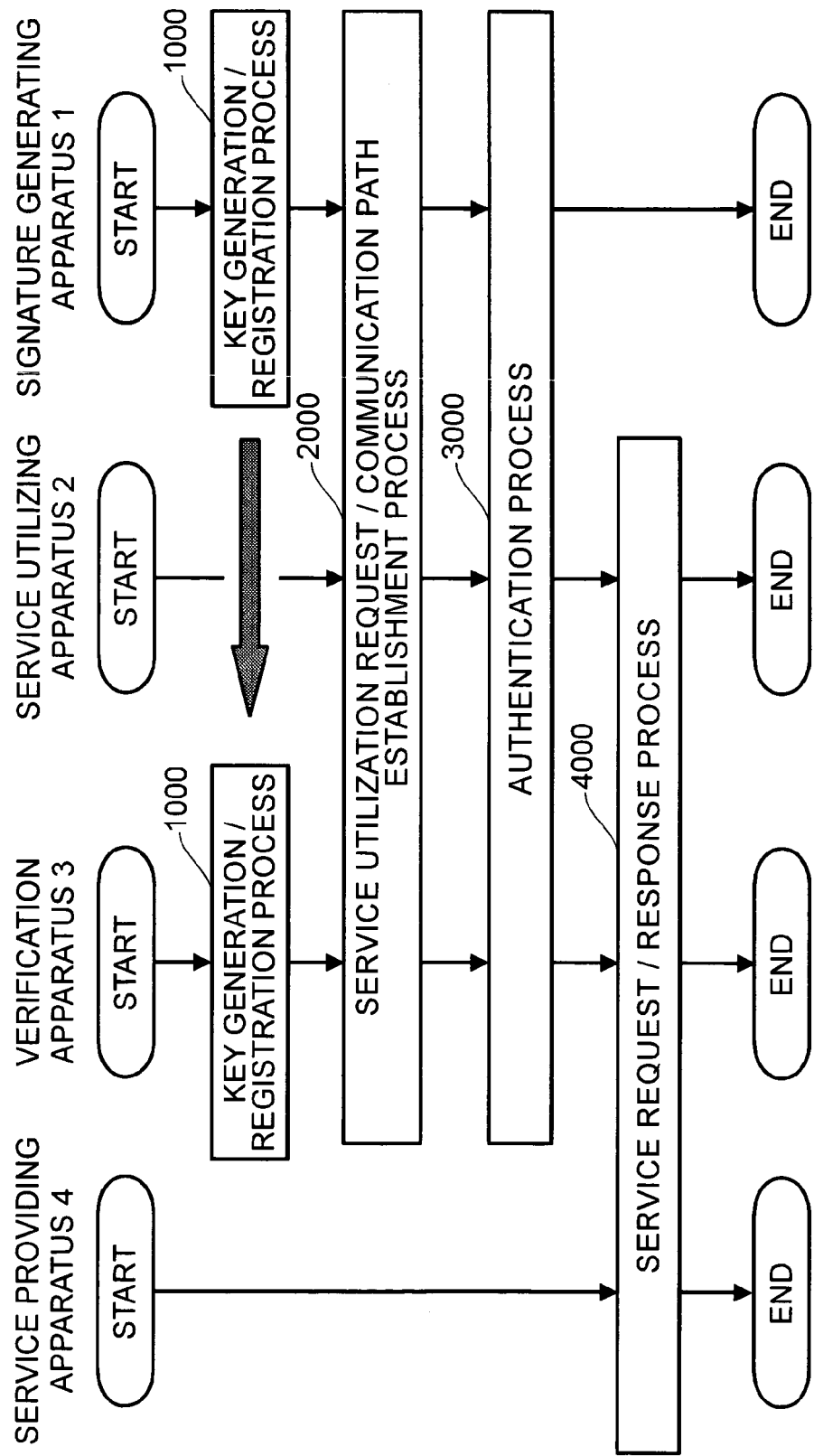
FIG. 4 is a flowchart for showing an outlook of the operation in the service providing system, according to the embodiment of the present invention.

Next, explanation will be given on the brief structure of each of the apparatuses building up the system mentioned above, by referring to FIG. 3. As is shown in FIG. 3, the signature generating apparatus 1, according to the present embodiment, comprises a communicator (communication device) 11, a controller (controlling device) 12, a memory device 13, an input/output device 14, a signature generation device 15, and a key generation device 16.

The communicator 11 achieves communication between the service utilizing apparatus 2 through the communication path 7, as well as, communication between the verification apparatus 3 through the communication path 8.

The controller 12 is a device for executing a program held within the memory device 13, so as to control the operations of the signature generating apparatus 1, as a whole. Thus, it transmits the verification key generated by the key generation device 16 to the communicator 11, thereby to be transmitted to the verification apparatus 3. Also, it transmits the random number received by the communicator 11 and the signature generation key 131 held within the memory device 13 to the signature generation device 15, so as to generate the electronic signature therein. Also, the electronic signature generated by the signature generation device 15 and the apparatus ID 132 held within the memory device 13 are transmitted to the communicator 11, so as to be transmitted to the service utilizing apparatus 2.

The memory device 13 is a device for holding the signature generation key 131, the apparatus ID 132, and the programs for operating various apparatuses and devices. As an example of this memory device 13 can be listed up, such as, a memory, a disk, a tape or the like, for example.

The input/output device 14 is a device for a user to operates the signature generating apparatus 1, or to input an instruction for the service utilization request, or to input/output the information relating to the key generation. As an example of this input/output device 14 can be listed up, for example, a button, a switch, a remote controller, a mouse, a keyboard, a microphone, a display, a lamp, a speaker, etc.

The signature generation device 15 is a device for generating the electronic signature, with using the random number inputted and the signature generation key 131.

The key generation device 16 is a device for generating a pair; such as, a generation key and a verification key of the electronic signature.

Also, as shown in FIG. 3, the service utilizing apparatus 2, according to the present embodiment, comprises a communicator (communication device) 21, a controller (controlling device) 22, a memory device 23, and an input/output device 24.

The communicator 21 achieves communication between the signature generating apparatus 1 through the communication path 7, and also communication between the verification apparatus 3 through the network 6.

The controller 22 is a device for executing the programs held within the memory device 23, so as to control the operations of the service utilizing apparatus 2, as a whole. Thus, it transfers the service utilization request inputted from the input/output device 24 to the communicator 21, thereby to be transmitted to the verification apparatus 3. Also, it transfers an inquiry about the communication path, which is received by the communicator 21, to be outputted to the user, for prompting an input of the communication path information. Also, it transfers the communication path information, which is inputted by the user through the input/output device 24, so as to be transmitted to the verification apparatus 3. Also, it transfers the communication component 331, which the input/output device 24 receives, into the memory device 23, thereby to be held therein. Also, applying the communication component 331 therein, it enables communication between the signature generating apparatus 1 through the communication path corresponding thereto. Also, it controls the communicator 21 to transfer the random number, which is received from the verification apparatus 3, to the signature generating apparatus 1. It also controls the communicator 21 to transfer the electronic signature and the apparatus ID, which are received from the signature generating apparatus 1, to the verification apparatus 3. And also, it transfers the result of service response, which the communicator 21 receives, to the input/output device 24, thereby bringing it to output the response result therefrom.

The memory device 23 is a device for holding the communication components 331 and the programs therein. As an example of this memory device can be listed up, for example, a memory, a disk, a tape or the like.

The input/output device 24 is a device for the user to operate the service utilizing apparatus 2, to input an instruction of service utilization, and also to output a result of the service response thereupon. As an example of this input/output device 24 can be listed up, for example, a button, a switch, a remote controller, a mouse, a keyboard, a microphone, a display, a lamp, a speaker, etc.

Also, as is shown in FIG. 3, the verification apparatus, according to the present embodiment, comprises a communicator (communication device) 31, a controller (controlling device) 32 and a memory device 33.

The communicator 31 achieves communication between the service utilizing apparatus 2 through the network 6, and also communication between the service providing apparatus 4 through the network 5.

The controller 32 is a device for executing the programs held within the memory device 33, so as to control the operation of the verification apparatus 3, as a whole. Thus, it transfers the signature generation key and the apparatus ID, which the communicator 31 receives from the signature generating apparatus 1, into the memory device 33, thereby holding them into the database 332 while keeping the correspondence or relationship between them. It also transfers the inquiry about the communication path to the communicator 31, thereby to be transmitted to the service utilizing apparatus 2. It also picks up the communication components suitable to the communication path information, which the communicator 31 receives, among those held within the memory device 33. The communication component 331 selected is transferred into the communicator 31, thereby to be transmitted to the service utilizing apparatus 2. Also, it controls the verification process portion 333 to generate the random number therefrom, and it transfers the generated random number to the communicator 31, thereby to be transmitted to the service utilizing apparatus 2. It also transfers the electronic signature and the apparatus ID, which the communicator 31 receives, to the verification process portion 333, so as to make the electronic signature verified therein. Also, it controls the communicator 3 to transfer the service utilization request and the apparatus ID, which are received from the service utilizing apparatus 2, to the service providing apparatus 4. It further controls the communicator 31 to transfer the result of service response, which is received from the service providing apparatus 4, to the service utilizing apparatus 2.

The memory device 33 is a device for holding the communication component 331, the database 332, the verification process portion 333, and other programs therein. As an example of this memory device 33 can be listed up, such as, a memory, a disk, a tape or the like, for example.

The verification process portion 333 is a processing portion for generating the random number and for verifying the electronic signature therein, which is generated from the random number produced, by using the signature verification key. The program for operating the verification apparatus 3 as the verification process portion 333 is held within the memory device 33, and it is executed within the controller 32.

Also, as is shown in FIG. 3, the service providing apparatus 4, according to the present embodiment, comprises a communicator (communication device) 41, a controller (controlling device) 42, and a memory device 43.

The communicator 41 achieves communication between the verification apparatus 3 through the network 5.

The controller 42 is a device for executing the programs held within the memory device 43, so as to control the operations of the service providing apparatus 4, as a whole. Depending upon the service utilization request that the communicator 41 receives, it executes the service responses, such as, distribution of the contents 431, etc. It also controls the database 432 of the memory device 43, to hold the contents of the service response while keeping the correspondence or relationship between the apparatus ID, which is received at the same time when receiving the service utilization request. Also, it transfers the result of service response to the communicator 41, thereby to be transmitted to the verification apparatus 3.

Hereinafter, explanation will be made about the brief operations of the system mentioned above, according to the one embodiment of the present invention, by referring to FIG.

4. First of all, between the signature generating apparatus 1 and the verification apparatus 3, there is executed a process of key generation/registration (i.e., a step 1000). Next, among the signature generating apparatus 1, the service utilizing apparatus 2 and the verification apparatus 3, there is executed a process for service utilization request/communication path establishment (i.e., a step 2000). Next, among the signature generating apparatus 1, the service utilizing apparatus 2, the verification apparatus 3 and the service providing apparatus 4, there is conducted a verification process (i.e., a step 3000). Next, among the service utilizing apparatus 2, the verification apparatus 3 and the service providing apparatus 4, there is executed a process for service request/response (a step 4000), thereby completing the entire of the processes.

Figure 5:
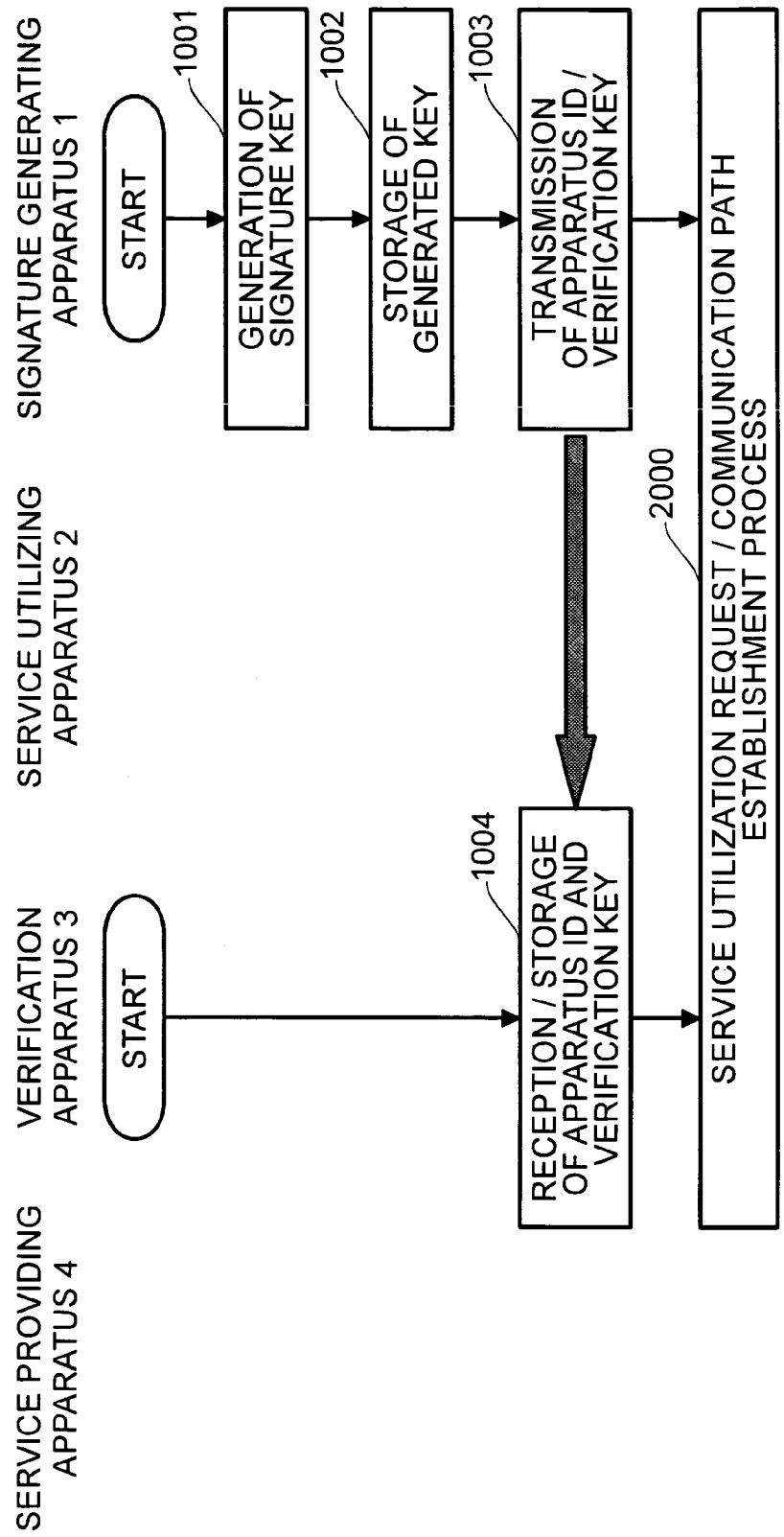
FIG. 5 is also a flowchart, but for showing an outlook of the operation of key generation/registration processing (a step 1000) in the service providing system, according to the embodiment of the present invention.

Hereinafter, explanation will be given about the operation of the key generation/registration (i.e., the step 1000), within the system mentioned above, according to the one embodiment of the present invention, by referring to FIG. 5. First of all, within the signature generating apparatus 1, the key generation device 16 thereof produces the generation key and the verification key for the electronic signature, in a pair (in a step 1001). Next, the memory device 13 holds the signature generation key 131 produced therein (in a step 1002). Next, the communicator 11 transmits the signature verification key produced and the apparatus ID 132, which is held within the memory device, to the verification apparatus 3 (in a step 1003).

Next, within the verification apparatus 3, the memory device 33 thereof holds the signature verification key and the apparatus ID 132, which the communicator 31 receives from the signature generating apparatus 1, into the database 332, while keeping the correspondence or relationship between them (in a step 1004).

Figure 6:
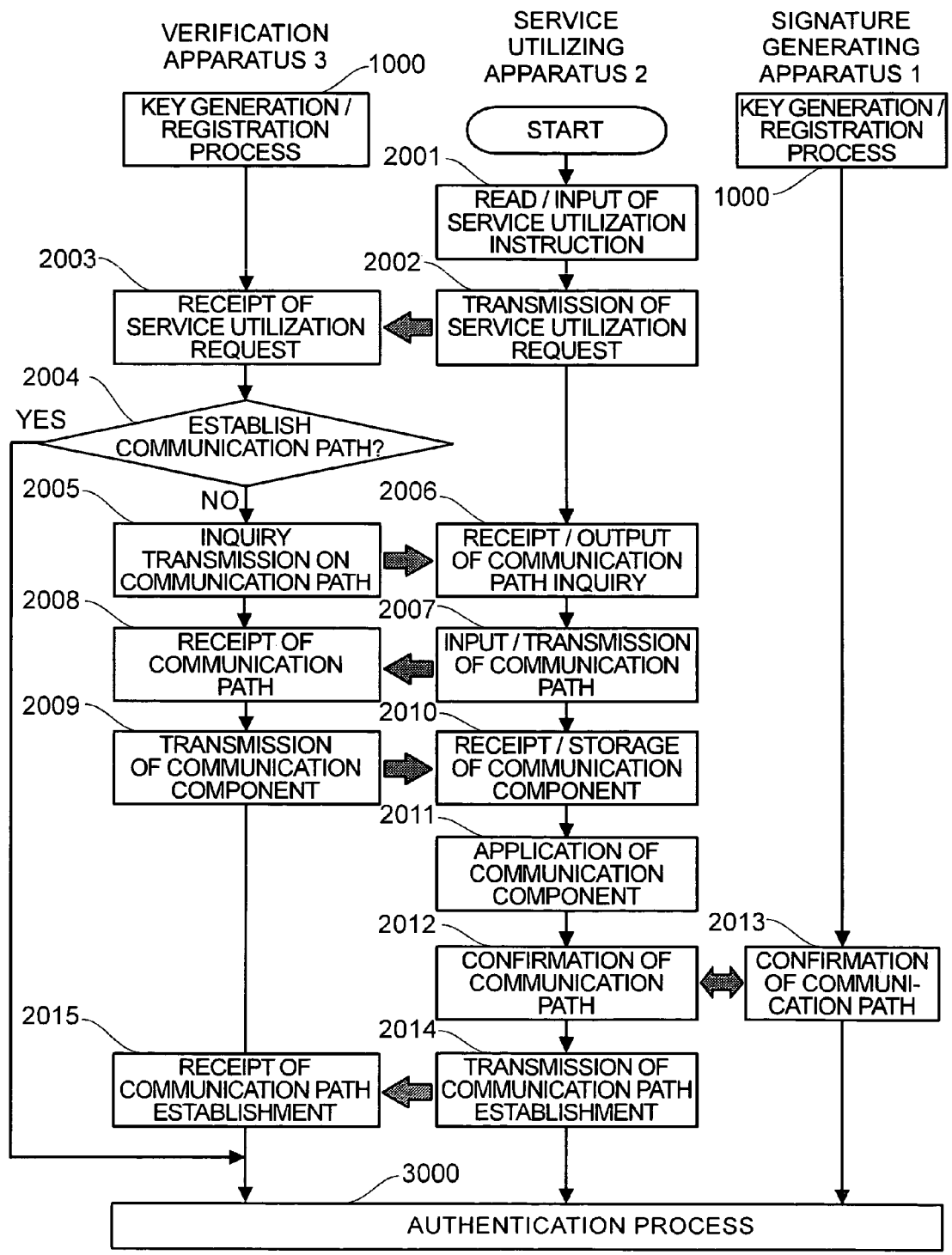
FIG. 6 is also a flowchart for showing an outlook of the operation of service utilization request/communication path establishment processing (a step 2000) in the service providing system, according to the embodiment of the present invention.

Hereinafter, explanation will be given about the operations about the service utilization request/communication path establishment process (the step 2000), within the system mentioned above, according to the one embodiment of the present invention, by referring to FIG. 6. First of all, the user inputs an instruction for service utilization request from the input/output device at the service utilizing apparatus 2 (in a step 2001). Next, the communicator 21 transmits the inputted service utilization request to the verification apparatus 3 (in a step 2002).

Next, within the verification apparatus 3, the communicator 31 thereof receives the service utilization request (in a step 2003), while the controller 32 checks on whether the communication path is established or not between the service utilizing apparatus 2 and the signature generating apparatus 1 (in a step 2004). In a case where the communication path was established in advance (see "Yes" in the step 2004), then the process advances to an authentication process (in a step 3000). In the case where the communication path is already established, then the service utilization request is transmitted from the communicator 11 of the signature generating apparatus 1, or it may be transferred to the verification apparatus 3 by means of the communicator 21 of the service utilizing apparatus 2. In a case where the communication path is not yet established (see "No" in the step 2004), then the communicator 31 transmits an inquiry about the communication path to the service utilizing apparatus 2 (in a step 2005).

Next, within the service utilizing apparatus 2, the communicator 21 thereof receives the inquiry about communication path, while the input/output device 24 provides an output for prompting the user to input the communication path between the signature generating apparatus 1 (in a step 2006). Next, the communicator 21 transmits the information about the communication path, which the user inputs through the input/output device 24, to the verification apparatus 3 (in a step 2007).

Next, within the verification apparatus 3, the communicator 31 thereof receives the information about the communication path (in a step 2008). Next, the controller 32 picks up the most suitable one among the communication components 331 held within the memory device 33, with using the information about the communication path received, and it brings the communicator 31 to transmit it to the service utilizing apparatus 2 (in a step 2009).

Next, within the service utilizing apparatus 2, the communicator 21 thereof receives the communication component 331, while the memory device 23 holds the communication component 331 received therein (in a step 2010). Next, the controller 22 applies the communication component received (in a step 2011). Further, the controller 22 confirms that the communication path of using the communication component 331 is established or not between the service utilizing apparatus 2 and the signature generating apparatus 1 (in steps 2012 and 2013). The communicator 21 transmits the fact that the communication path is established to the verification apparatus 3 (in a step 2014).

Next, within the verification apparatus 3, the communicator 31 thereof receives the fact that the communication path is established (in a step 2015), and then the process advances to the authentication process (i.e., the step 3000).

Figure 7:
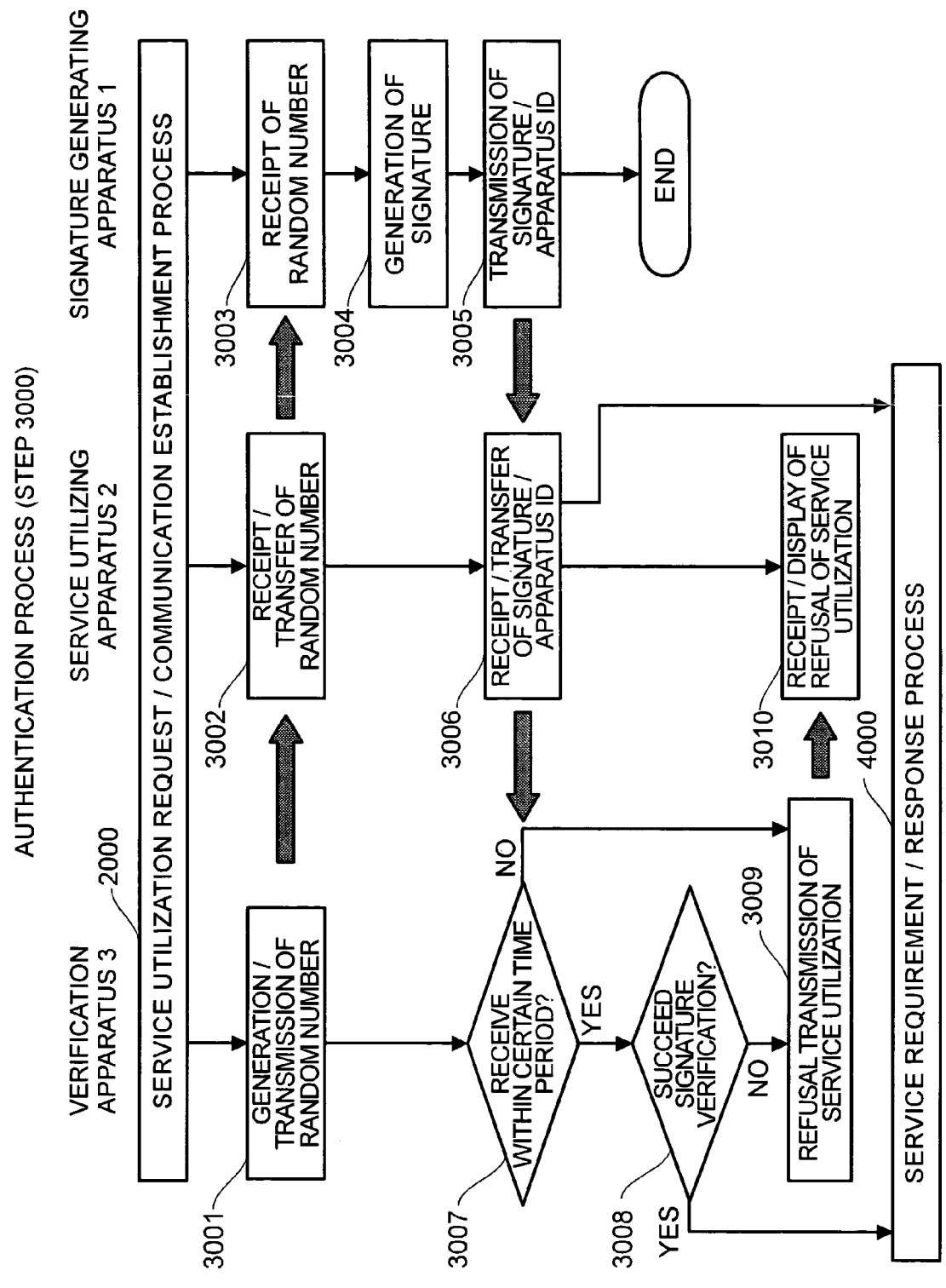
FIG. 7 is a flowchart for showing an outlook of the operation of authentication processing (a step 3000) in the service providing system, according to the embodiment of the present invention.

Hereinafter, explanation will be made about the operations of the authentication process (i.e., the step 3000), within the system mentioned above, according to the one embodiment of the present invention, by referring to FIG. 7. First of all, within the verification apparatus 3, the verification process portion 333 thereof produces or generates the random number, and the communicator 31 thereof transmits the produced random number to the service utilizing apparatus 2 (in a step 3001).

Next, within the service utilizing apparatus 2, the communicator 21 thereof transfers the random number received from the verification apparatus 3, to the signature generating apparatus 1 (in a step 3002).

Next, within the signature generating apparatus 1, the communicator 11 thereof receives the random number (in a step 3003). Next, the signature generating device 15 produces the electronic signature by using the random number received and the signature generation key held within the memory device 13 (in a step 3004). Next, the communicator 11 transmits the electronic signature produced and the apparatus ID held within the memory device 13 to the service utilizing apparatus 2 (in a step 3005).

Next, within the service utilizing apparatus 2, the communicator 21 thereof transfers the electronic signature and the apparatus ID 132, which are received from the signature generating apparatus 1, to the verification apparatus 3 (in a step 3006).

Next, within the verification apparatus 3, in a case where the communicator 31 thereof receives the electronic signature and the apparatus ID 132, within a predetermined time period after transmission of the random number in the step 3001 (see "Yes" in the step 3007), then the verification process portion 333 takes out the signature verification key corresponding to the apparatus ID 132 received from the database 332, thereby conducting the verification upon the electronic signature received (in a step 3008). In a case where the result of verification is successful (see "Yes" in the step 3008), the process advances to the service request/response process (in a step 4000).

In the case where the communicator 31 does not receive the electronic signature and the apparatus ID 132 within the predetermined time period from the transmission of the random number in the step 3001 (see "No" of the step 3007), or in a case where the result of the verification upon the electronic signature received is unsuccessful (see "No" of the step 3008); then, the communicator 31 transmits an effect of refusing the service utilization to the service utilizing apparatus 2 (in a step 3009).

Next, within the service utilizing apparatus 2, the communicator 21 thereof receives the refusal of service utilization, while the input/output device 24 outputs that effect thereon, so as to inform it to the user (in a step 3010).

Figure 8:
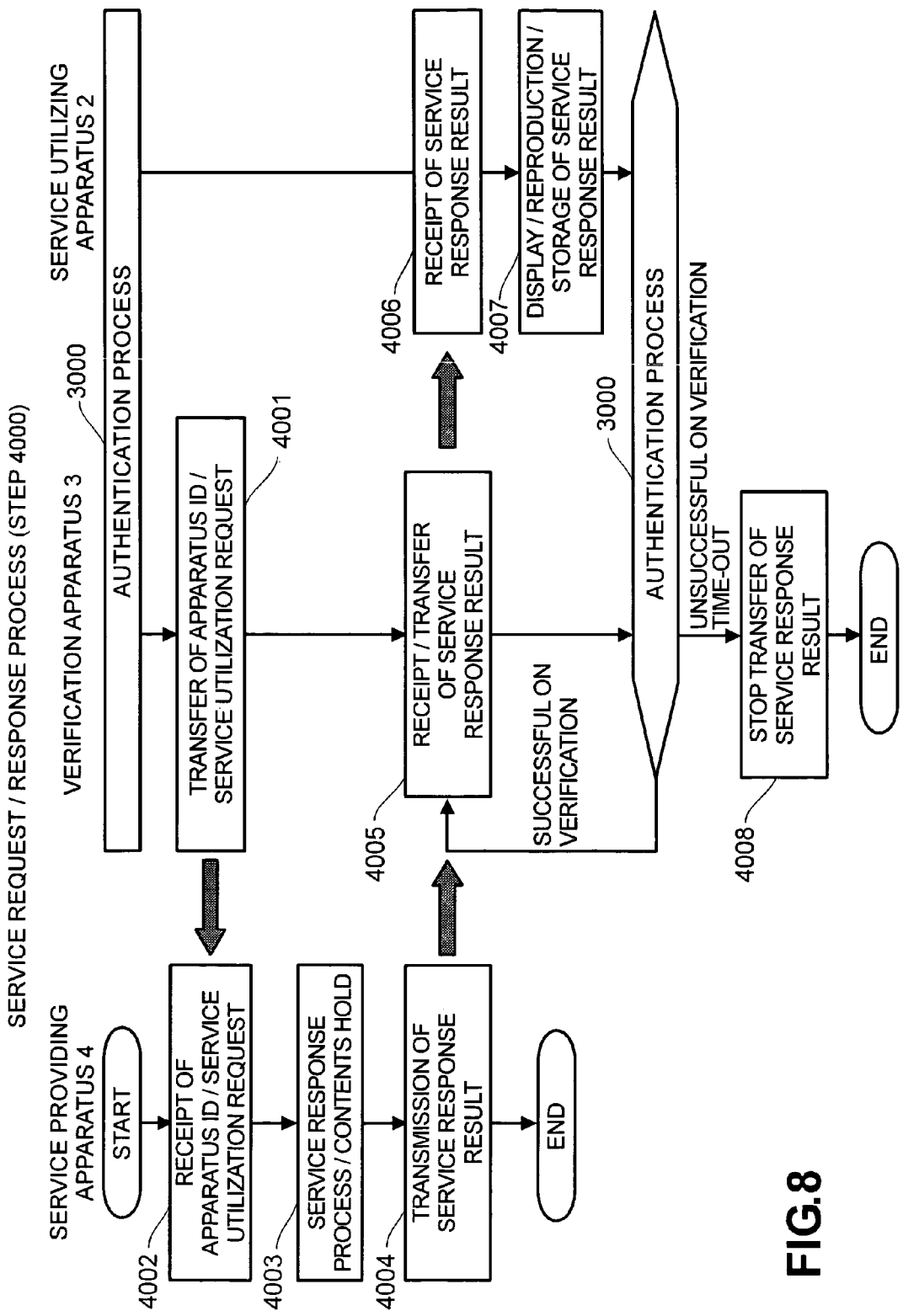
FIG. 8 is a flowchart for showing an outlook of the operation of service request/response processing (a step 4000) in the service providing system, according to the embodiment of the present invention.

Hereinafter, explanation will be given about the operations of the service request/response process (i.e., the step 4000), within the system mentioned above, according to the one embodiment of the present invention, by referring to FIG. 8. First of all, within the verification apparatus 3, the communicator 31 thereof transmits the service utilization request, which is received in the step 2003, and the apparatus ID 132, which is received in the step 3007, to the service providing apparatus 4 (in a step 4001).

Next, in the service providing apparatus 4, the communicator 41 thereof receives the service utilization request and the apparatus ID (in a step 4002). Next, the controller 42 conducts the services responding to the service utilization request received, and holds the apparatus ID 132 received and the contents of the service response into the database 432 within the memory device 43, while keeping the correspondence or relationship between them (in a step 4003). Next, the communicator 41 transmits the result of service response to the verification apparatus 3 (in a step 4004). For example, in a case where the service providing apparatus is a contents distribution server while the service required is distribution of the contents, for example, then the communicator 41 transmits the distribution data of contents 431 to the verification apparatus 3, as a result of the service response.

Next, within the verification apparatus 3, the communicator 31 thereof transmits the result of the service response received from the service providing apparatus 4, to the service utilizing apparatus 2 (in a step 4005).

Next, within the service utilizing apparatus 2, the communicator 21 thereof receives the result of the service response (in a step 4006). Next, the controller 22 brings the input/output device 24 to output the result of the service response thereon, thereby informing it to the user (in a step 4007). For example, in a case where the result of the service response is the distribution data of the contents 431, then the controller 22 reproduces the contents 431, to be displayed on the input/output device 24.

Next, between the verification apparatus 3 and the service utilizing apparatus 2, the authentication process 3000 is conducted. As a result thereof, if being authenticated (i.e., successful), the verification apparatus 3 continues to conduct a transfer process (in a step 4005). On the contrary to the above, if the result of the authentication process is unsuccessful, or if time-out occurs therein, then the verification apparatus 3 stops the transfer process (in a step 4008), thereby ending up that process.

Figure 9:
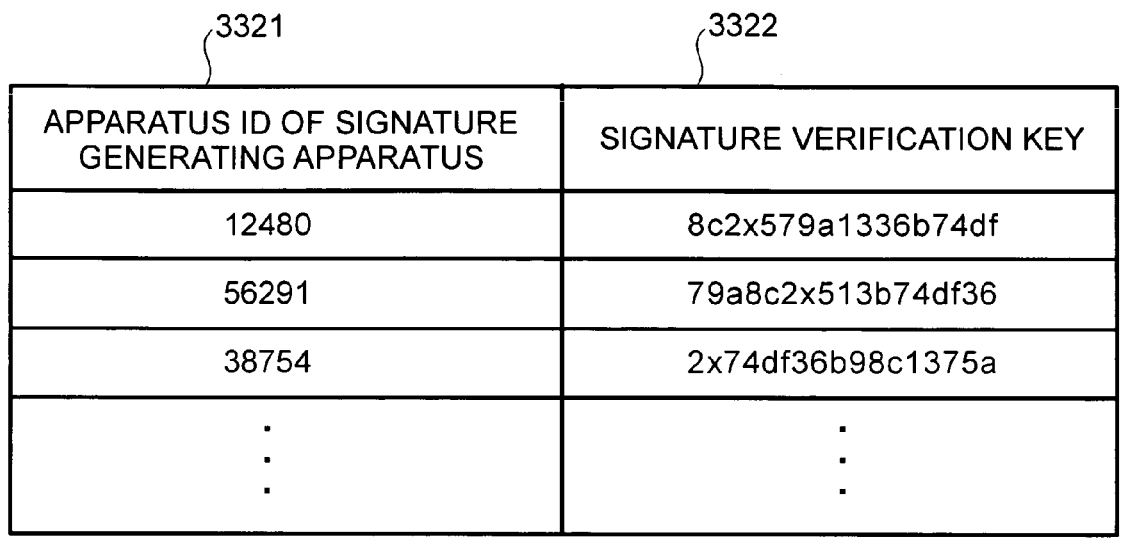
FIG. 9 is a view for showing an example of a database for the verification apparatus within the service providing system, according to the embodiment of the present invention.

Hereinafter, explanation will be given on the data, being made corresponding to, within the database 332 of the verification apparatus 3, according to the one embodiment of the present invention, by referring to an example shown in FIG. 9. As is shown in FIG. 9, within the database 332, an apparatus ID 3321 of the signature generating apparatus 1 and a signature verification key 3322 are made corresponding to each other. In a column of the apparatus ID 3321 is held the apparatus ID 132, which the communicator 31 of the verification apparatus 3 receives in the step 1004, while in a column of the signature verification key 3322 neighboring thereto is held the signature verification key, which is received at the same time of the apparatus ID 132, while keeping the correspondence or relationship between them.

Figure 10:
FIG. 10 is a view for showing another example of the database for the verification apparatus within the service providing system, according to the embodiment of the present invention.

Hereinafter, explanation will be given on the data, being made corresponding to within the database 432 of the service providing apparatus 4, according to the one embodiment of the present invention, by referring to FIG. 10. This FIG. 10 shows a case where the service providing apparatus 4 is the contents distribution server while the service required is the contents distribution. As is shown in this FIG. 10, within the database 432 are established the correspondence or relationship between a date/time 4321 corresponding to the service request, an apparatus ID 4322 of the apparatus, which makes a request/utilization of services, contents 4323 being distributed, and a charge data for the distribution contents. In the column of the apparatus ID 4322 is held the apparatus ID, which the communicator 41 of the service providing apparatus 4 receives in the step 4002, and in the column of the distribution contents neighboring thereto is held the contents of the service, which is required by the service utilization request received at the same time of the apparatus ID 132, i.e., the contents distribution, while keeping the correspondence or relationship between the date and the charge data thereon.

Hereinafter, explanation will be made about an output screen displayed on the input/output device 24 in the step 2006, within the service utilizing apparatus 2, according to the one embodiment of the present invention, by referring to an example shown in FIG. 11. This FIG. 11 makes an indication to the user that, for the service utilizing apparatus 2 to receive the service provided by the contents providing apparatus 4, it is necessary to conduct the communication with the signature generating apparatus 1, so as to be authenticated by the verification apparatus 3. Also, this FIG. 11 prompts the user to input a kind of communication path to be used when the service utilizing apparatus 2 establishes the communication between the signature generating apparatus 1. Though such the structure is shown, that the selection is made in the form of a radio button and is followed by clicking on an "OK" button, in this FIG. 11, however it should not always be such the radio button, necessarily, but it may be a method of selecting from a dropdown list in the place thereof, or may be a method of designating a button, which is provided for each the communication path, by clicking thereon, as far as, an instruction can be made about the communication path.

Within the service providing system according to the embodiment of the present invention, an authentication system is built up with the signature generating apparatus 1, the service providing apparatus 2 and the verification apparatus 3, a service utilization system is with the signature generating apparatus 1 and the service utilizing apparatus 2, and also an electronic signature authentication system is with the signature generating apparatus 1 and the verification apparatus 3, respectively, and further there is also built up a service providing request system with the service utilizing apparatus 2 and the verification apparatus 3.

Furthermore, in the embodiment mentioned above, the explanation was made about the signature generating apparatus 1, the service utilizing apparatus 2 and the verification apparatus 3, however those apparatuses can be practiced with using computer software; i.e., setting a computer to achieve each of those functions, respectively.

In the above, the explanation was given on the embodiment according to the present invention. With such the embodiment according to the present invention, an arbitrary number produced by the verification apparatus 3, such as, the random number, for example, is delivered to,the signature generating apparatus 1, and the signature generating apparatus 1 generates the electronic signature from the random number received. The signature generating apparatus 1 transmits the electronic signature generated to the verification apparatus 3, and the verification apparatus 3 verifies the electronic signature received. If the result of the verification is successful, the verification apparatus 3 authenticates the signature generating apparatus 1.

For this reason, the random number being exchanged between the verification apparatus 3 and the signature generating apparatus 1, and the electronic signature generated from the random number can be different one, every time when processing each authentication; therefore, it is possible to achieve high security.

Also, wish such the embodiment according to the present invention, it is possible to centralize the signature generating functions of plural number of the service utilizing apparatuses 2 into one (1) signature generating apparatus 1, while separating the signature generating apparatus 1 and the service utilizing apparatus 2 of being the substantial object of the authentication into different bodies. The verification apparatus 3 delivers the random number to the signature generating apparatus 1 through the service utilizing apparatus 2, and it receives the electronic signature generated by the signature generating apparatus 1 through the service utilizing apparatus 2. The service utilizing apparatus 2 and the signature generating apparatus 1 conduct communication with each other by using the short-distance communication means using a light therein; such as, the IR and/or BT, thereby confirming that both are locating near to each other. In the case when the electronic signature generated by the signature generating apparatus 1 can be verified, correctly, upon the random number transmitted, the verification apparatus 3 authenticates, not only the signature generating apparatus 1, but also the service utilizing apparatus 2, which relays the random number and the electronic signature between the signature generating apparatus 1 with using the short-distance communication means.

For this reason, the signature generation function can be centralized into the signature generating apparatus 1. Also, depending upon the range or distance of infrared rays used in the IR communication and/or that of radio waves used in the BT communication, since the available distance is restricted between the service utilizing apparatus 2 and the signature generating apparatus 1, therefore it is possible to achieve high security.

Also, with such the embodiment according to the present invention, it is possible to bring the programs necessary for the communication means between the service utilizing apparatus 2 and the signature generating apparatus 1 into the form of a component. The programs of the component basis, and also the object-oriented programs, as well, can be divided into modules of programs, by a unit of the component and the object, respectively; however, the module of the programs of component basis, differing from the object-oriented programs, can be acknowledged within the programs in the form of the execution format by a unit of component. Therefore, it is possible to renew/add the module of programs into the system during the operation thereof.

It is also possible that the verification apparatus provides the communication component to the service utilizing apparatus 2. For this reason, it is also possible to select an appropriate means, even in the case where the service utilizing apparatus 2 has a plural number of the short-distance communication means, thereby enhancing common or wide utilization thereof, much more. Also, due to the restriction upon the communication components, it is possible to increase the security thereof.

Also, it is possible to read out the information presented on the display of the service utilizing apparatus 2 through an optical reader of the signature generating apparatus 1, and in such case, the possibility is lower in spreading out the information into an environment thereof, comparing to the case where it is read out by using the IR and/or the BT; therefore, it is possible to achieve the security much higher.

Also, according to the present invention, the service utilizing apparatus 2 transmits the service utilization request to the verification apparatus 3, and the verification apparatus 3 transmits the random number to the service utilizing apparatus 2, thereby starting a flow of authentication. However, it is also possible to start the flow of authentication from the signature generating apparatus 1; i.e., if once the communication component 331 is loaded onto the service utilizing apparatus 2, then thereafter, the service utilizing apparatus 2 transfers the service utilization request to the verification apparatus 3. For this reason, it is possible to access to the service utilizing apparatus 2 from a side of the signature generating apparatus 1, thereby achieving automatic starting of the access process.

Also, according to the present invention, after succession of the authentication, the verification apparatus 3 transmits the service utilization request of the service utilizing apparatus 2 to the service providing apparatus 4, and the response made by the service providing apparatus 4 responding to this request is transferred to the service utilizing apparatus 2. For this reason, it is possible to centralize the signature verification functions into the verification apparatus 3.

Also, according to the embodiment of the present invention, the service utilizing apparatus 2 acknowledges that it is far from the signature generating apparatus 1, due to the fact that it cannot make communication through the short-distance communication means, therefore it can unload the communication component 331 from the memory. For this reason, it is possible to save the memory resources owned by the system, and also, since it is possible to hide the communication component 331, which is necessary for the utilization thereof, thereby increasing the security thereof.

Also, according to the embodiment of the present invention, the verification apparatus 3 conducts the authentication process, periodically, after starting the transfer of the service utilization response, thereby stopping the transfer of the service utilization response at the time point when the authentication cannot be made. For this reason, even in the case of using the service utilizing apparatus 2, which is high in the publicity thereof, such as, the terminal(s) located within a convenience store and/or a kiosk, etc.; thus, if the user carrying the signature generating apparatus 1 is far from a side of the service utilizing apparatus 2, it is possible to detect that fact, so as to turn back into the initial condition thereof, thereby improving the usability thereof for the user in the next time.

Also, according to the embodiment of the present invention, by using a unique number of the apparatus of the signature generating apparatus 1, it is possible to specify the user of the service utilizing apparatus 2, so as to account the charge for the utilization service. For this reason, it is possible for the service provider side to discriminate the user uniquely, even if the user uses any one of the service utilizing apparatuses, thereby accounting the charge thereon in a lump sum.

Also, according to the embodiment of the present invention, the explanation was mainly made that, the verification apparatus 3 and the service providing apparatus 4 are separated from each other, however, it is also possible to use an apparatus, which mounts the functions of both into one (1) apparatus.

And also, according to the embodiment of the present invention, the explanation was made that the service providing apparatus 4 is the contents distribution server, for example, in the above, however it may be a HDR, a home electric controller, a home network gateway, or a database server, etc., other than the contents distribution server mentioned above.

Further, according to the embodiment of the present invention mentioned above, it is described that the communication is achieved by using the BT or IR or the lights, between the signature generating apparatus 1 and the service utilizing apparatus 2; however, in the case where the signature generating apparatus 1 is a portable telephone apparatus, for example, the communication can be conducted by using the telephone networks. In this instance, an owner of the signature generating apparatus 1 differs from the user of the service utilizing apparatus 2. Then, the user of the service utilizing apparatus 2 or the verification apparatus 3 makes a telephone call to the portable telephone apparatus, being the signature generating apparatus, thereby confirming on whether the service utilization request can be delivered or not to the service providing apparatus 4. If it is possible to confirm that through a push-button thereof, then the service utilization/response process is conducted.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A service providing system, comprising:
   a signature generating apparatus;
   a service utilizing apparatus;
   a verification apparatus; and
   a service providing apparatus, wherein
   said signature generating apparatus, comprises: a communicating means; a key producing means for producing a generation key for generating an electronic signature and a verification key for verifying righteousness of the electronic signature produced by using said generation key, in a pair; a memory means for holding said generation key; and a signature generating means for generating the electronic signature, by using an arbitrary number received from said service utilizing apparatus and the generation key, whereby transmitting the electronic signature to said service utilizing apparatus and also transmitting the verification key to said verification apparatus;
   said service utilizing apparatus, comprises: a communication means; a service request means for requesting a service to be utilized; and a service utilization means for utilizing a response to said service request, thereby transferring the arbitrary number received from the verification apparatus to the signature generating apparatus, and the electronic signature received from said signature generating apparatus to said verification apparatus, while transmitting the request for the service to be utilized to the verification apparatus;
   said verification apparatus, comprises: a communication means; an arbitrary number producing means for producing an arbitrary number to be used by the signature generating apparatus in generation of the electronic signature; a memory means for holding the verification key received from the signature generating apparatus; and a signature verification means for verifying the electronic signature by using said arbitrary number and said verification key, whereby transmitting said arbitrary number to the service utilizing apparatus, transferring the service request received from said service utilizing apparatus to said service providing apparatus, when the electronic signature, which the service utilizing apparatus transfers by using said signature verification means, is correctly verified, and transferring a response to the service request received from said service providing apparatus to said service utilizing apparatus; and said service providing apparatus, comprises: a communication means; and a service execution means for executing service responding to the service request, whereby turning a result of execution of the service responding to the service request transferred from the verification apparatus back to said verification apparatus as a response to the service request.

2. The service providing system, as described in the claim 1, wherein said service providing apparatus has a memory means for holding a unique identification number of the signature generating apparatus, the result of the service execution and charge information for said service execution, while keeping correspondence between them.

3. An authentication system, comprising:
   a signature generating apparatus;
   a service utilizing apparatus; and
   a verification apparatus; said signature generating apparatus, comprises: a communicating means; a key producing means for producing a generation key for generating an electronic signature and a verification key for verifying righteousness of the electronic signature generated by the generation key, in a pair; a memory means for holding said generation key therein; and a signature generating means for generating the electronic signature, by using an arbitrary number received from said service utilizing apparatus and the generation key, whereby transmitting the electronic signature to said service utilizing apparatus and also transmitting the verification key to said verification apparatus;
   said service utilizing apparatus, comprises: a communication means; a service request means for requesting a service to be utilized; and a service utilization means for utilizing a response to said service request, thereby transferring the arbitrary number received from the verification apparatus to the signature generating apparatus, and the electronic signature received from said signature generating apparatus to said verification apparatus, while transmitting the request for the service to be utilized to the verification apparatus; and
   said verification apparatus, comprises: a communication means; an arbitrary number producing means for producing an arbitrary number to be used by the signature generating apparatus in generation of the electronic signature; a memory means for holding the verification key received from the signature generating apparatus; and a signature verification means for verifying the electronic signature by using said arbitrary number and said verification key, whereby transmitting said arbitrary number to the service utilizing apparatus, transferring the service request received from said service utilizing apparatus to a service providing apparatus, when the electronic signature, which the service utilizing apparatus transfers by using said signature verification means, is correctly verified, and transferring a response to the service request received from said service providing apparatus to said service utilizing apparatus.

4. A service utilizing apparatus comprising:

communication means;

service request means for requesting a service to be utilized; and service utilization means for utilizing a response to a service request, thereby transferring an arbitrary number received from a verification apparatus to a signature generating apparatus, and an electronic signature received from said signature generating apparatus to said verification apparatus, while transmitting the request for the service to be utilized to the verification apparatus;

wherein:

a component of a communication program, for transmitting information from said verification apparatus to the signature generating apparatus by using the communication means identified, and for transmitting the information from said signature generating apparatus to said verification apparatus by using said communication means identified, is loaded from said verification apparatus, and thereby bringing the communication means identified to be usable; and said component of the communication program is unloaded from a memory when acknowledging that it is far from the signature generating apparatus, since communication cannot be made by means of said communication means.

5. A verification apparatus, comprising:

communication means;

arbitrary number producing means for producing an arbitrary number to be used by a signature generating apparatus in generation of an electronic signature;

memory means for holding a verification key received from the signature generating apparatus; and signature verification means for verifying the electronic signature by using said arbitrary number and the verification key, whereby transmitting said arbitrary number to a service utilizing apparatus, transferring a service request received from said service utilizing apparatus to a service providing apparatus, when the electronic signature, which the service utilizing apparatus transfers by using said signature verification means, is correctly verified, and transferring a response to the service request received from said service providing apparatus to said service utilizing apparatus.

6. The verification apparatus, as described in the claim 5, wherein said memory means holds therein the verification key received from the signature generating apparatus and the number unique to said signature generating apparatus.

7. The verification apparatus, as described in the claim 5, wherein said arbitrary number is a random number.

8. The verification apparatus, as described in the claim 5, wherein said transferring of the service request is stopped when the electronic signature cannot be verified correctly using the signature verification means during the transfer of the requested services.

9. The verification apparatus, as described in the claim 5, wherein information from the verification apparatus is transferred to the signature generating apparatus through specifying the communication means, and information from said signature generating apparatus is transmitted to the service utilizing apparatus, by selecting a component of a communication program for transferring information to said verification apparatus, by means of said communication means.

10. The verification apparatus, as described in the claim 5, wherein said communication means is a means communicable with the signature generating apparatus through radio waves.

* * * * *

UNITED STATES PATENT AND TRADEMARK OFFICE
CERTIFICATE OF CORRECTION

PATENT NO. : 7,590,842 B2
APPLICATION NO. : 10/887334
DATED : September 15, 2009
INVENTOR(S) : Chikashi Okamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1405 days.

Signed and Sealed this

Twenty-first Day of September, 2010

David J. Kappos
*Director of the United States Patent and Trademark Office*